Nov. 9, 1948.
D. S. GREY
IMAGE FORMING OPTICAL LENS SYSTEM
ATHERMALIZED FOR FOCAL POINT
Filed March 5, 1946
2,453,218
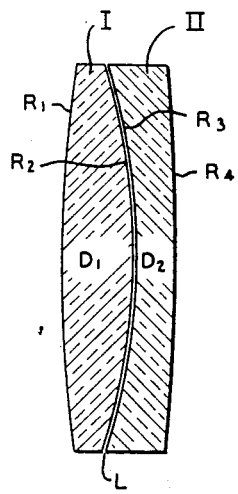
F/5  FOCAL LENGTH = 100 MM
| LENS | RADIUS | Thickness & Separation | $N_D$ | V |
|---|---|---|---|---|
| I | $R_1 = +69.40$ | $D_1 = 3.77$ | 1.50825 | 55.3 |
|   | $R_2 = -32.66$ | $L = .05$ | | |
| II | $R_3 = -32.66$ | $D_2 = 1.95$ | 1.59 | 31. |
|   | $R_4 = -111.04$ | | | |
INVENTOR
David S. Grey
BY
Donald L. Brown
Attorney Patented Nov. 9, 1948

SEARCH ROOM 2,453,218

UNITED STATES PATENT OFFICE 2,453,218

IMAGE FORMING OPTICAL LENS SYSTEM ATHERMALIZED FOR FOCAL POINT

David S. Grey, Lexington, Mass., assignor to Polaroid Corporation, Cambridge, Mass., a corporation of Delaware Application March 5, 1946, Serial No. 652,063

4 Claims. (Cl. 88—57)

This invention relates to optical systems and more particularly to systems which are athermalized for focal point and to methods for athermalizing the same.

This application is a continuation-in-part of my copending application, Serial No. 491,493, filed June 19, 1943, for Optical systems, and which has become Patent No. 2,406,762, dated September 3, 1946.

In optical systems having one or more lens elements formed of a material highly subject to thermal effects, changes in temperature result in undesirable change in the position of the focal plane or surface of the system unless neutralization of these changes is effected. An important object of the invention is the provision of an optical system comprising a plurality of elements at least one of which is formed of a material highly subject to thermal effects and at least one of which is formed of a material considerably less subject to thermal effects and wherein temperature changes produce no appreciable change in the back focal length of the system, that is to say to provide a substantially athermalized system.

Other objects of the invention are the provision of optical systems having elements formed of "crown" and "flint" materials respectively which are considerably differently subject to thermal effects and which are shaped and arranged to substantially athermalize or predeterminedly partially athermalize the system and which correct, at least in part, the optical aberrations of the system and specifically to provide systems of the foregoing character which are athermalized and achromatized.

Still other objects of the invention are to provide optical systems which are athermalized and in which all the elements thereof are formed of transparent organic plastic materials which are suitable for use as "crown" and "flint" materials and which have thermal expansion properties of considerable difference as well as to provide a system having elements formed of materials such as have been set forth but with each element of the system having a thermal nu value and a chromatic nu value such that the ratio of the thermal nu value to the chromatic nu value is a constant of a magnitude substantially equal to a like constant for every other element of the system and with the elements shaped and spaced to achromatize the system and thereby effect athermalization thereof.

Equally important with the foregoing objects are the provision of methods for forming an optical system which is substantially athermalized for focal point or athermalized for focal point to a predetermined degree and which comprises at least one element of material highly subject to thermal effects and at least one element considerably less subject to thermal effects as well as to provide methods for athermalizing systems formed entirely of lens materials comprising different transparent organic plastics.

Further objects of the invention are the provision of methods for forming optical systems which are athermalized by the use of "crown" and "flint" materials of the character described by shaping and arranging the elements to provide both athermalization and correction at least in part of the optical aberrations of the system; to provide methods whereby a system when achromatized is necessarily athermalized; and to provide methods for forming athermalized optical systems by the use of materials such as have been set forth but with each element in the system having a thermal nu value and a chromatic nu value such that the ratio of the thermal nu value to the chromatic nu value is a constant of a magnitude substantially equal to a like constant for every other element of the system and with the elements shaped and spaced to achromatize the system.

The invention accordingly comprises the several steps and relation and order of one or more of such steps with respect to each of the others, and the article possessing the features, properties and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing which is a section taken along the axis of a lens system which embodies the invention.

It is highly desirable to employ organic resins and plastics for the formation of optical elements, especially because of the low costs which are involved. A difficulty encountered in the use of such materials is found in the fact that most of those employable for the production of optical elements are relatively highly susceptible to changes in dimensions and properties with variations in temperature. When plastics are used as the lens materials for the components of a lens system, changes with temperature of the index of refraction, curvature and thickness of each element are of such magnitude as to cause variation in the back focal length of the system of an undesired order unless compensation of some character is made to neutralize such changes. By the back focal length of a lens system is meant the distance on the optical axis of the system from the last lens surface, that is the lens surface most distant from the object, to the image surface. On the other hand, glass, the material now commonly used for the formation of lenses, is negligibly subject to thermal effects so that in the design of glass systems it is generally possible to neglect thermal variations.

Since it is inconvenient and frequently impracticable to refocus an optical system, it becomes necessary in the use of systems employing a plurality of plastic lens elements to provide a system of such a character that temperature changes produce no appreciable change in the back focal length thereof or only a predetermined change. Such a system may be described as athermalized and the method by which the system is athermalized may be described as the athermalization thereof.

My previously mentioned copending application describes an athermalized lens system comprising a plurality of lens elements of organic plastic materials and one or more elements of glass, the latter athermalizing the system. In this athermalized system the glass serves as the "thermal crown" and the plastic as the "thermal flint." Substantially complete athermalization is achieved under such circumstances by arranging the elements in axial alignment at spacings which satisfy the condition that the sum of the convergence factors of the plastic elements approximately equals zero while the convergence factor summation for the glass element or elements approximates the power of the system, the convergence factor of a lens meaning the product of the position factor $h^2$ and the power of the lens where $(1-h)$ is the fractional convergence of a paraxial ray incident on the lens. Since the power of a lens equals $$\frac{1}{f}$$

where $f$ is the focal length, the convergence factor may also be written as $$\frac{h^2}{f}$$

In my before-mentioned copending application, the convergence factor of a lens is defined as the product of the position factor $(1-C)^2$ and the power of the lens, where $C$ is the fractional convergence of a paraxial ray incident on the lens. Subsequent computations and explanation will, however, be simplified and facilitated by setting the expression $(1-C)^2$ equal to $h^2$ and such practice is followed herein.

In athermalizing a lens system of the character just described use is made of an equation similar to the achromatization equation for focal point and involving a constant $V_T$ which is analogous to the constant $V_C$ used in achromatization. The thermal nu or $V_T$ of a lens material may be expressed by a single parameter characteristic of the material and is a function of $E_T$, the linear coefficient of expansion of the material, and $D_T n$, the rate of change of the index of refraction $n$ of the material with change in temperature T, the quantitative value of $V_T$ for a lens material being equal to the reciprocal of the expression $$\left(\frac{D_T n}{n-1} - E_T\right)$$

and for a reflecting material being equal to the reciprocal of $-E_T$.

As previously noted the athermalized system of my copending application employs as lens materials glass and plastics, that is materials which are respectively negligibly subject to thermal effects and which are appreciably subject to thermal effects. The plastics or "thermal flint" materials of such a system have approximately equal coefficients of expansion as well as rates of change in index per degree centigrade and hence have approximately equal thermal nu values. In the system of my copending application, the glass lens means have a power which is related to the power of the system as a whole and the plastic lens means correct the system for at least one aberration.

The subject matter of the present invention goes further than my copending application in that the present invention means to provide a lens system all elements of which are formed of plastic materials, together with a method of athermalizing such a system as well as a method of athermalizing a system of glass and plastic lens material.

In general, where all the elements of the system are of plastic materials, it is unnecessary that any of the lens materials possess approximately equal thermal nu values. In other words, the thermal nu values of the individual elements may all be different and certain of the lens materials may be appreciably or relatively highly subject to thermal effects while other lens material or materials may be considerably less subject to thermal effects.

In accordance with this invention, at least approximate athermalization or predetermined partial athermalization is achieved for a system comprising a plurality of optical elements of suitable "flint" and "crown" materials at least one of which is highly subject to thermal effects and at least one element of which is considerably less subject to thermal effects by shaping and spacing said elements to have predetermined radii and focal lengths which correct the system at least in part for optical aberrations, give a predetermined power to the system and satisfy conditions to be hereinafter explained in connection with equations to be subsequently derived and which make it possible to athermalize a system having all lens elements thereof formed of plastic materials as well as to athermalize a lens system having plastic elements and glass elements.

Consider a lens in air, if the thickness of the lens is small enough so that the conventional thin lens formula for paraxial image formation is accurate, then $$\frac{1}{S} + \frac{1}{S'} = (n-1)\left(\frac{1}{R_1} - \frac{1}{R_2}\right) = \frac{1}{f} \qquad (1)$$

where

S is the object distance from the lens,
S' is the image distance from the lens,
$n$ is the index of refraction of the lens material,
$R_1$ and $R_2$ are the radii of curvature of the lens, and
$f$ is the focal length of the lens.

Now let S, S', $n$, $R_1$ and $R_2$ have rates of change with regard to temperature equal respectively to $D_T S$, $D_T S'$, $D_T n$, $D_T R_1$ and $D_T R_2$. For such condition Equation 1 becomes:

$$\frac{D_T S}{S^2} + \frac{D_T S'}{(S')^2} = -D_T n\left(\frac{1}{R_1} - \frac{1}{R_2}\right) + \left(\frac{D_T R_1}{R_1^2} - \frac{D_T R_2}{R_2^2}\right)(n-1) \qquad (2)$$

but
$$\frac{D_T R_1}{R_1} = \frac{D_T R_2}{R_2} = \frac{D_T R}{R} = E_T$$

where $E_T$ is the coefficient of linear expansion. Consequently, $$\frac{D_T S}{S^2} + \frac{D_T S'}{(S')^2} = \left(-\frac{D_T n}{n-1} + \frac{D_T R}{R}\right)(n-1)\left(\frac{1}{R_1} - \frac{1}{R_2}\right) \quad (3)$$

but $$(n-1)\left(\frac{1}{R_1} - \frac{1}{R_2}\right) = \frac{1}{f}$$

from Equation 1 and substituting this in 3 there is obtained $$\frac{D_T S}{S^2} + \frac{D_T S'}{(S')^2} = \left(-\frac{D_T n}{n-1} + \frac{D_T R}{R}\right)\frac{1}{f} \quad (4)$$

$$= -\frac{1}{fV_T} \quad (5)$$

where $$\frac{1}{V_T} = \left(\frac{D_T n}{n-1} - \frac{D_T R}{R}\right) = \left(\frac{D_T n}{n-1} - E_T\right)$$

Generally speaking, $$\frac{D_T R}{R}$$

is nearly proportional to $$\frac{D_T n}{n-1}$$

Consequently, $$\frac{1}{V_T}$$

is approximately equal to $-(W+1)E_T$, where $E_T$, as previously noted, is the coefficient of linear expansion and $-W$ is the approximate constant of proportionality between $$\frac{D_T n}{n-1} \text{ and } \frac{D_T R}{R}$$

Therefore, in the usual athermalization computations only $E_T$ need be known. Reference will hereinafter be sometimes made to athermalization based on $E_T$. However, this is not to imply that such teaching neglects $$\frac{D_T n}{n-1}$$

but is given as a simplification in ordinary treatment and is here mentioned by way of explanation of the invention.

Similarly if $S$, $S'$, and $n$ have rates of change with regard to wavelength which equal respectively $D_\lambda S$, $D_\lambda S'$ and $D_\lambda n$, then $$\frac{D_\lambda S}{S^2} + \frac{D_\lambda S'}{(S')^2} = -\frac{1}{fV_C} \quad (6)$$

where $$\frac{1}{V_C} = \frac{D_\lambda n}{n-1}$$

and where $V_C$, the color nu is proportional to the chromatic nu or Abbé number of the lens material.

In a lens system comprising a plurality $N$ of thin lens elements, in contact or separated, from Equations 5 and 6 for any lens $K$ of the system $$\frac{D_T S_K}{S_K^2} + \frac{D_T S_K'}{(S_K')^2} = -\frac{1}{f_K V_{T,K}} \quad (7)$$

$$\frac{D_\lambda S_K}{S_K^2} + \frac{D_\lambda S_K'}{(S_K')^2} = -\frac{1}{f_K V_{C,K}} \quad (8)$$

Rewriting Equations 7 and 8 as follows:

$$D_T S_K' = -(S_K')^2\left(\frac{1}{f_K V_{T,K}} + \frac{D_T S_K}{S_K^2}\right) \quad (9)$$

$$D_\lambda S_K' = -(S_K')^2\left(\frac{1}{f_K V_{C,K}} + \frac{D_\lambda S_K}{S_K^2}\right) \quad (10)$$

From the foregoing, it follows that when $$D_T S_K' D_\lambda S_K' = 0$$

athermalization and achromatization of a system will be achieved through the Kth lens thereof when the value for $D_T S'$ for each lens preceding the Kth lens satisfies Equation 9. If the Kth lens is taken as the Nth or last lens, the entire system will be athermalized when these conditions are met.

The foregoing has stressed the analogous relationship between athermalization and achromatization. This relationship becomes more marked by rewriting Equations 9 and 10 for the last or Nth lens of the system in the following form:

$$D_T S_N' = \sum_{K=1}^{N} \frac{-h_K^2}{f_K V_{T,K}} \quad (11)$$

$$D_\lambda S_N' = \sum_{K=1}^{N} \frac{-h_K^2}{f_K V_{C,K}} \quad (12)$$

The convergence factor, heretofore mentioned, is given by the expression $$\frac{h_K^2}{f_K}$$

found in Equations 11 and 12. Equations 11 and 12 assume that at the first lens of the system, that is, the lens nearest the object, $D_T S_1 = D_\lambda S_1 = 0$. The values for the $-h_K^2$ will be functions only of the individual lens powers and separations and the object distance $S_1$. From further consideration it will appear that the athermalizing equation for $D_T S_K = 0$ and the achromatizing equation for $D_\lambda S_K' = 0$ are linear in the variables $$\frac{1}{VT_K} \text{ and } \frac{1}{VC_K}$$

and have like coefficients $$-\frac{h_K^2}{f_K}$$

If the object distance $S$ from the first lens surface changes with temperature, Equation 11 becomes:

$$D_T S_N' = \left[\sum_{K=1}^{N} -\frac{h_K^2}{f_K V_{T,K}}\right] - \frac{(S')^2}{S^2} D_T S \quad (11a)$$

where $D_T S$ is the rate of change of said object distance with temperature, and $S$ and $S'$ are the distances of the object and image, respectively, from the nodal points of the lens system. A further explanation of changes of this character will subsequently appear.

Substantially accurate athermalization of a system of thin lenses may be achieved in accordance with the foregoing teaching. In systems having one or more thick lenses at least approximate athermalization may be achieved through use of the practices described in connection with Equation 9. This approximate athermalization, if desired, can be made more accurate by recomputations. If higher accuracy is desired from the initial treatment, the method of athermalization which has been described can be extended to thick lenses. Such extension employs the use of expressions related to but more involved than those heretofore set forth, due to the fact that with thick lenses it is necessary to consider the individual lens surfaces as distinguished from thin lens treatment wherein each lens is considered as a whole and the separate surfaces thereof are neglected.

The formula for paraxial image formation at a lens surface, as at the Kth surface of a system of thick lenses having N surfaces or interfaces, may be conventionally written as follows:

$$\frac{n_{K-1}}{S_K}+\frac{n}{S_K'}=\frac{n_K-n_{K-1}}{R_K} \quad (13)$$

where K represents any surface of the system, $n_{K-1}$ the index on the object side of the Kth surface, and $n_K$ the index on the image side thereof, and where R, S and S' denote, respectively, the radius, object distance, and image distance at the indicated surface.

If $n_K$, $n_{K-1}$, $S_K$ and $S'_K$ and $R_K$ have rates of change with regard to temperature respectively equal to $D_T n_K$, $D_T n_{K-1}$, $D_T S_K$, $D_T S_K'$ and $D_T R_K$, it may be shown, in a manner similar to that for thin lenses, that at the Kth surface of a system of thick lenses $$D_T S_K' = S_K' \frac{D_T n_K}{n_K} - \frac{(S_K')^2}{n_K}\left\{\frac{D_T n_K - D_T n_{K-1}}{R_K} - \frac{n_K - n_{K-1}}{R_K^2} D_T R_K - \frac{n_{K-1}}{S_K^2} D_T S_K - \frac{D_T n_{K-1}}{S_K}\right\} \quad (14)$$

From Equation 14 it will be apparent, in a manner similar to that shown in connection with Equation 9, for thin lenses, that any system of thick lenses will be substantially athermalized when the value of $D_T S'$ at the last surface N, that is the surface of the system most distant from the object, is substantially equal to zero and the value of $D_T S'$ for each lens surface K preceding the last surface N satisfies Equation 14. In other words, any system of thick lenses is substantially athermalized when $D_T S_N'=0$ and when $D_T S_K'$, the rate of change with temperature of the image distance of each lens surface K preceding the surface N is given by Equation 14.

It will be apparent from the foregoing that when a system of thick lenses are constructed and arranged to fulfill the conditions just described in regard to Equation 14, athermalization of the system will be obtained regardless of the thermal characteristics of the materials forming the individual lenses. Similarly, athermalization for thin lenses may be achieved by following the teaching set forth in connection with Equation 9. As it has been pointed out, at least approximate athermalization of any lens system is possible by use of the thin lens treatment. At the same time, it is also possible to athermalize a thin lens system by use of the thick lens procedure, it being here noted that the thick lens equations reduce to thin lens form if the factor of lens thickness is neglected.

The athermalization of a lens system or lack of athermalization thereof may best be studied by expressing Equation 14 in a more convenient form. The rate of change with temperature of the image distance from the Nth lens, that is $S_N'$, is dependent upon a large number of properties or variables of the component parts of the lens system. Associated with each of these variables, $S_N'$ has a partial derivative with respect to temperature, the total derivative of $S_N'$ with respect to temperature being the sum of its partial derivatives. Expressed in equation form, these statements are $$\left(\frac{\partial}{\partial T} S_N'\right)_{x_i} = \frac{\partial S_N'}{\partial x_i} D_T x_i \quad (15)$$

$$D_T S_N' = \sum_{K=1}^{N} \frac{\partial S_N'}{\partial x_i} D_T x_i \quad (16)$$

where $i$ is any lens surface in a system, $$\left(\frac{\partial}{\partial T} S_N'\right)_{x_i}$$

denotes the rate of change of $S_N'$ due to the rate of change of $x_i$ with temperature, $D_T S_N'$ denotes the rate of change of $S_N'$ with temperature due to rates of change with temperature of all of the $x_i$ upon which $S_N'$ is dependent, and the $x_i$ are variables, each chosen to be a parameter representing the partial rate of change of image distance after the $i$th surface, this partial rate of change being due solely to thermal changes which occur after refraction at the $(i-1)$th surface.

Under these conditions it may be established that $$\frac{\partial S_N'}{\partial x_i} D_T x_i = \frac{n_i}{(S_i)^2} h_i^2 \frac{\partial S_i'}{\partial T} \quad (17)$$

from which it follows that $$D_T S_N' = \sum_{i=1}^{N} \frac{\partial S_i'}{\partial T} \frac{n_i}{(S_i')^2} h_i^2 \quad (18)$$

where $$\frac{\partial S_i}{\partial T}$$

is the partial rate of change with temperature of $S_i'$ due to changes which occurred after the $(i-1)$th surface, $n_i$ is the index of the medium following the $i$th surface, $h_i$ is the ratio of the height of a paraxial ray at the $i$th surface to the height of the same ray at the first surface, and the units used in computation are such that $$h_N = \frac{S_N'}{n_N}$$

$n_N$ being the index of refraction after the last surface, usually 1.

For a lens with object at infinity, this requires that the units used in computation be such that the focal length is 1.

With no loss of generality, any lens system may be considered as a series of lenses of index $n$ and each lens surrounded by a medium of index 1.

At the first surface of the Kth lens of a system having a plurality of lenses from $K=1$ to $K=N$:

$$\left[\frac{1}{S_1}+\frac{n}{S_1'}=\phi_1\right]_K \quad (19)$$

and $$[\phi_1]_K = \left[\frac{n-1}{R_1}\right]_K \quad (20)$$

The subscript K outside the brackets denotes that all terms within the brackets refer to the Kth lens and the subscript 1 refers to the first surface thereof, that is the surface on the object side of the lens.

At the second surface of said Kth lens $$[S_2 = -S_1' + t]_K \quad (21)$$

$t_K$ being the thickness of the Kth lens, $$\left[\frac{n}{S_2}+\frac{1}{S_2'}=\theta_2\right]_K \quad (22)$$

$$[\theta_2]_K = \left[\frac{1-n}{R_2}\right]_K \quad (23)$$

and at the $(K+1)$th lens $$[S_1']_{K+1} = [-S_2' + L]_K \qquad (24)$$

Where $L_K$ is the distance from the Kth lens to the $(K+1)$th lens and the subscript 2 refers to the second surface of the lens noted, that is the surface furthest from the object.

In particular, $L_N$ is the desired distance from the last lens surface to the focal surface of the lens system as a whole and $D_T L_N$ is the desired rate of change of $L_N$ with temperature, said desired rate of change in general being not zero because of thermal expansion of the lens housing. If we define $D_T S_N'$ as the difference between the rate of change with temperature of $S_N'$ and the desired rate of change of $S_N'$ to compensate the thermal expansion of the lens housing:

$$D_T S_N' = -\sum_{K=1}^{N} \left[ \frac{\theta_1 h_1^2 + \theta_2 h_2^2}{V_T} + \left(\frac{h_1}{S_1'}\right)^2 n^2 D_T\left(\frac{t}{n}\right) + \left(\frac{h_2}{S_2'}\right)^2 D_T L \right]_K \qquad (25)$$

and the chromatic aberration $DS_N'$ is $$DS_N' = -\sum_{K=1}^{N} \left[ \frac{\theta_1 h_1^2 + \theta_2 h_2^2}{V_C} + \left(\frac{h_1}{S_1'}\right)^2 n^2 D_\lambda\left(\frac{t}{n}\right) \right]_K \qquad (26)$$

$h_1^2$, $h_2^2$ and $t$ in Equations 25 and 26 are the notations for position factor and thickness heretofore employed.

In Equation 25 the expression $$\frac{\theta_1 h_1^2 + \theta_2 h_2^2}{V_T}$$

may be termed the power factor of the system while the expression $$\left(\frac{h_1}{S_1'}\right)^2 n^2 D_T\left(\frac{t}{n}\right)$$

may be termed the thickness factor of the system and the expression $$\left(\frac{h_2}{S_2'}\right)^2 D_T L$$

may be termed the housing factor. As will subsequently more fully appear, the housing factor may be treated as the partial athermalization of the system due to changes with temperature in the length of the housing in which the system is mounted and changes with temperature of the spacing between elements. In instances when athermalization is to be achieved without regard to the housing as, for example, where the housing is of a character which will leave the system substantially unaffected, the housing factor in Equation 25 is neglected and becomes zero.

Athermalization is achieved for a system when the summation called for in Equation 25 is substantially equal to zero, assuming that the system is mounted in a housing which has some effect on athermalization. When the housing factor in Equation 25 is neglected, a system is of itself athermalized due to the construction and arrangement of its elements if the summation of the remainder of the expressions on the right of Equation 25 is substantially equal to zero and in all cases the sum of these remaining terms gives the lack of athermalization of the system considered apart from a housing.

Equations 25 and 26 may be used for the treatment of either thick or thin lenses. For example, when used for thin lenses, $t$ becomes equal to zero and $h_1$ equals $h_2$, while the expression $\phi_1 + \phi_2$ equals $$\frac{1}{f}$$

In this regard, it is interesting to note that if the $D_T L_K$ equal zero Equation 25 reduces to Equation 11. Similarly, Equation 26 can be reduced to Equation 12.

To practice the method of athermalization embodied in the equations heretofore derived obviously involves a tedious procedure, especially where the system is a complex one having a relatively large number of elements. Simplification to obtain athermalization compatible with the accuracy required is therefore highly desirable. It is possible by meeting certain predetermined requirements to circumvent much of the labor needed to put the hereinbefore described methods into effect.

For example, an athermalized system can be provided by the use of lens materials which have substantially equal or similar thermal nu values of small magnitudes for all of the elements of the system with the exception of at least one lens $K_J$ which has a large thermal nu value and small coefficient of linear expansion and by employing lens powers and separations for the individual lenses such that the summation of the values $$\frac{-h_K^2}{f_K}$$

for each material of similar thermal nu value is substantially zero while the summation of the values $$\frac{-h_J^2}{f_J}$$

approximates the power of the system. These conditions are those set forth in my copending application and may be met by the use of a lens system comprising a plurality of plastic elements of predetermined characteristics and at least one element of glass.

An important practice which permits simplification of the athermalization methods comprises the use of lens materials such that throughout the lens system the thermal nu for each element will at least be approximately equal to a constant times the chromatic nu or dispersion value of that element. Another way of stating this is that in a system comprising N elements from 1 to N.

$$\frac{V_{T_1}}{V_{C_1}} \doteq \frac{V_{T_2}}{V_{C_2}} \doteq \frac{V_{T_3}}{V_{C_3}} \cdots \frac{V_{T_n}}{V_{C_N}} \doteq M \qquad (27)$$

where M is a constant.

If expression 27 is satisfied so that $$[V_T]_K = M[V_C]_K$$

and if $D_\gamma S_N' = 0$; then Equation 25 becomes $$D_T S_N' = -\sum_{K=1}^{N} \left[ \left(\frac{h_1}{S_1'}\right)^2 (t)(E_T) + \left(\frac{h_2}{S_2'}\right)^2 D_T L \right]_K \qquad (28)$$

$E_{T,K}$ being the coefficient of linear expansion of the Kth lens.

A quick estimate of the order of magnitude of $D_T S_N'$ as given by Equation 28 may be made.

$$\frac{h_1}{S_1'} \text{ and } \frac{h_2}{S_2'}$$

will in general be numerically less than 1, and rarely much greater than 1. Considering only the part of Equation 28 due to thermal effects of the lens materials $D_T S_N'$ is approximately $$D_T S_N' \text{ is approximately } \sum_{K=1}^{N} [tE_T]_K$$

that is, the residual $D_T S_N'$ which gives the lack of athermalization will be of the order of magnitude of the sum of the rates of change of the central thicknesses of all the lenses. Even for plastic lens materials, $E_T$ is not likely to exceed $8 \times 10^{-5}$ per degree C. Consequently, an approximate upper limit to $D_T S_{N'}$ will be $$8 \times 10^{-5} \sum_{K=1}^{N} t_K$$

If $$\sum_{K=1}^{N} t_K = 50 mm$$

the approximate upper limit will be $4 \times 10^{-3}$ mm. per degree C. For most practical purposes, this would represent adequate athermalization and 50 mm. total central thickness of all lenses is a generous estimate. The term $D_T S_{N'}$ due to change in spacing is commonly neglected in even the best glass lens systems.

If in a critical case this is not adequate athermalization, or if the thermal and chromatic nu values are not in proportion, or if the terms in $D_T L_K$ are to be taken into account, the residual $D_T S_{N'}$ after achromatization may be written as:

$$D_T S_{N'} = -\sum_{K=1}^{N} \left[ \left(\frac{h_1}{S_1'}\right)^2 \cdot t \cdot E_T + \left(\frac{h_2}{S_2'}\right)^2 D_T L \right]_K$$
$$-\sum_{K=1}^{N} \left[ (\theta_1 h_1{}^2 + \theta_2 h_2{}^2) + t\left(\frac{h_1}{S_1'}\right)^2 (n-1) \right]_K \Delta K \Bigg\} \quad 29$$

where the $\Delta K$ are defined by $$\left[\frac{1}{V_T}\right]_K = \frac{1}{M}\left[\frac{1}{V_C}\right]_K + \Delta K \tag{30}$$

where M is the constant of expression 27.

If the $\Delta K$ are controllable, this defines a simple method of achieving exact athermalization. Practices by which the thermal characteristics of optical media may be selectively predetermined will presently appear. If the $\Delta K$ are not controllable and large, it will in general be impractical to attempt to achieve athermalization in conjunction with achromatization and correction of other lens aberrations, unless there are at least two media of relatively high chromatic nu for which $\Delta$ is greatly different, or at least two materials of relatively low chromatic nu for which $\Delta$ is greatly different. Either of these eventualities presents the possibility of athermalization. My aforementioned copending application provides means for athermalization by use of two media of high chromatic nu but greatly different $\Delta$.

To athermalize by the use of materials which have thermal and chromatic characteristics in proportion, it is necessary to have one material of a relatively low coefficient of linear expansion. It has previously been mentioned that plastics suitable for optical use have in general high coefficients of linear expansion. This means that they have relatively low thermal nu values. There are, however, certain plastic materials which have comparatively low coefficients of linear expansion although these plastics possess expansion coefficients which are higher than glass. Cyclohexyl methacrylate which has an expansion coefficient of $7.6 \times 10^{-5}$ may be given as an example of a plastic having a high coefficient of linear expansion while ethylene dimethacrylate which has a coefficient of expansion of $2.3 \times 10^{-5}$ may be named as an example of a plastic having a relatively low coefficient of linear expansion. At the same time, plastics having suitable indices of refraction and dispersion values to serve as "flint" and "crown" materials are available.

If, in the design of an optical system, plastic polymers having thermal and optical properties in the desired proportion are unavailable, it is possible to mix several plastic materials and form a copolymer or interpolymer having properties of the desired character. As it is well known to the art, a copolymer may be formed upon polymerizing a mixture formed of a base substance, for example a linear material, and a cross-linking or modifying agent, for example a cross-linked material. The physical and optical properties of the copolymer will lie intermediate between those of the materials forming the same and will be related to the proportions of the individual materials and their specific properties.

For example, if two plastics of different coefficients of thermal expansion are copolymerized, the resulting material will have a coefficient of expansion which is lower than one of the materials of the mixture and higher than the other material. Generally speaking, the change in the expansion coefficient will be roughly one-half the difference between the expansion coefficients of the two materials forming the mixture if these materials are mixed in equal quantities. Change in the coefficient of expansion $E_T$ will also mean a corresponding change in the thermal nu value $V_T$. As heretofore set forth, generally speaking, a proportional relationship exists between $V_T$ and $E_T$ which permits $E_T$ to be substituted for $V_T$ with little loss of accuracy while allowing simplification in discussion.

Similarly, the optical properties such as the index of refraction and dispersion value of a material may be modified by the addition thereto of a predetermined quantity of a suitable plastic which will copolymerize therewith.

In forming the copolymer, one or more modifying agents may be added to a base material. The modifying agent or agents may be cross-linked substances or linear substances or both.

Many modifying or cross-linking agents are known. For the purpose of illustration it is, however, necessary only to mention a few suitable agents of this character. The invention may be practiced by the use of modifying or cross-linking agents selected from materials having similar functional polymerizable groups and materials having dissimilar functional groups, as well as from materials of the type of condensation polymers.

To name a few such materials having similar functional polymerizable groups, mention may be made of the acrylates and $\alpha$ substituted acrylates. Of those having two similar functional polymerizable groups, ethylene glycol dimethacrylate, tetramethylene glycol dimethacrylate, pentamethylene glycol dimethacrylate, hexylmethylene glycol dimethacrylate, diethylene glycol dimethacrylate, triethylene glycol dimethacrylate, and tetraethylene glycol dimethacrylate may be named. Suitable materials having three similar functional groups include trimethylol propane trimethacrylate, glycerine trimethacrylate and other methacrylates of trihydroxy compounds. Materials having four similar functional polymerizable groups are found in pentaerythrityl tetramethacrylate and other methacrylic esters of tetra-hydroxy compounds.

Modifying agents having two or more dissimilar functional polymerizable groups are, for example, allyl methacrylate, $\alpha$ and $\beta$ methallyl methacrylate and corresponding acrylates and $\alpha$-substituted acrylates.

Modifying agents of the condensation polymer type may be found in the class of phenol, cresol and urea aldehyde condensation products and intermixtures thereof.

As heretofore indicated, the cross-linking or modifying agent is to be mixed with a base material. Linear polymeric plastics provide excellent base materials and any of the foregoing cross-linking agents may be mixed therewith. Acrylic and alpha-substituted acrylic esters of primary and secondary alcohols may be named as especially suitable base materials and methyl methacrylate and cyclohexyl methacrylate may be mentioned as representative thereof. Base materials other than linear polymers may be employed. For example, there may be used as a base material a mixture of styrene and a cross-linked substance such as a divinyl compound from the class consisting of divinyl benzene, di-isopropenyl benzene, and corresponding diphenyl compounds.

The modifying and base materials in monomeric form are mixed in the desired proportions whereby to permit the formation of a copolymer of predetermined thermal and/or optical characteristics and the mixture is polymerized. The formation of copolymers is preferably practiced from a monomeric mixture in liquid condition. Many of the monomeric materials employed will be liquids which are miscible with each other. If one monomer is a solid, it should be dissolved in the other monomeric material before polymerization. It is also possible to liquefy a solid monomer by melting it. If there is no cross-linked material in the mixture, partial polymerization thereof is carried out to form a viscous liquid which is then introduced into a mold for completion of polymerization. On the other hand, if cross-linked material is present in the mixture, preferably no polymerization is carried out before introduction of the mixture into the mold.

Polymerization after the mixture is placed in a mold of a shape suitable to form a desired lens element may be effected by the use of heat and/or actinic light and/or chemical catalysis. Before introducing the monomeric mixture into the mold, a suitable catalyst may be added thereto as well as a surface activating agent or mold lubricant. Polymerization and casting practices, generally similar to those described in the application of Edwin H. Land et al., Serial No. 524,824, filed March 1, 1944, for Process for producing molded or cast elements and products thereof, now Patent No. 2,428,415, may be used in the present invention for the formation of optical elements of a copolymer of the character desired. When the material being polymerized is of a linear character, polymerization is preferably effected at temperatures below the softening point of the polymer as it is pointed out in the just-mentioned application. However, when a cross-linked material is used, polymerization is carried out at any convenient temperature. Practices and methods set forth in the just-mentioned copending application of Edwin H. Land et al. are particularly suitable for the provisions of optical elements formed of a single linear polymer such as the styrene element hereinafter more fully described.

It has been pointed out that the properties or characteristics of a polymer may be adjusted by the addition of another material thereto. If the thermal properties of the polymers of the base material and the modifying agent are similar, a copolymer possessing like thermal properties may be expected, on polymerization of a mixture of the base material and modifying agent in monomeric form, regardless of the proportions of the mixture. Similarly, when the optical characteristics of materials of the mixture are similar, the copolymer resulting on polymerization may be expected to have similar optical characteristics.

While it is not essential to the invention, an ideal condition is presented when the polymers of the base material and the modifying agent possess at least approximately similar indices of refraction and dispersion values but coefficients of thermal expansion which have widely separated values. Examples of materials of this character are found in ethylene glycol dimethacrylate, commonly called and hereinafter referred to as "ethylene dimethacrylate," and in cyclohexyl methacrylate. Cyclohexyl methacrylate has an index of refraction for the sodium line of 1.5066 and a dispersion value of 56.2, while ethylene dimethacrylate has substantially similar optical properties in that its index for the sodium line is 1.50991 and in that its dispersion value is 54.4. On the other hand, cyclohexyl methacrylate has a coefficient of linear expansion of $7.6 \times 10^{-5}$ per degree C., while ethylene dimethacrylate has a coefficient of expansion of $2.3 \times 10^{-5}$ per degree C.

It may be noted that cyclohexyl methacrylate and ethylene dimethacrylate have indices of refraction and dispersion values which make them suitable for use as "crown" materials. Since these optical characteristics of cyclohexyl methacrylate and ethylene dimethacrylate are so closely similar, copolymerization of these materials will result in the formation of a substance having substantially the same optical characteristics but having a coefficient of linear expansion which will vary between the limits of $2.3 \times 10^{-5}$ per degree C. and $7.6 \times 10^{-5}$ per degree C. depending upon the proportion of the materials in the mixture from which the copolymer is formed. With this in mind, it becomes apparent that an athermalized and achromatized lens system may be provided by the employment of an optical "flint" material of a character having a thermal nu value to which the thermal nu value of the copolymer of cyclohexyl methacrylate and ethylene dimethacrylate may be proportioned and which has an index of refraction and a dispersion value comparable with "flint" substances. A suitable "flint" material is found in styrene which has a coefficient of linear expansion of $7.1 \times 10^{-5}$ per degree C., this being of similar order to cyclohexyl methacrylate, and which has an index of refraction of 1.5910 and a dispersion value of 31.

It will be apparent in providing a lens system having one or more elements of a copolymer which will satisfy the desired proportionality when used with one or more elements of styrene that the copolymer should have an index of refraction and dispersion value about the same as that of ethylene dimethacrylate and cyclohexyl methacrylate but that the coefficient of linear expansion thereof should be about midway between the expansion coefficients of the materials from which the copolymer is formed. Ethylene dimethacrylate and cyclohexyl methacrylate monomers are liquids. If a mixture of equal volumes of ethylene dimethacrylate and cyclohexyl methacrylate is polymerized, the resulting copolymer will have a coefficient of linear expansion of approximately $4.9 \times 10^{-5}$ per degree C. and an index of refraction and dispersion value respectively of approximately 1.50825 and 55.3. A quickly calculated approximation will conclusively show that the materials just named can be used to provide an optical system having the necessary relation between the thermal and chromatic nu values of the individual elements to provide a system which becomes athermalized when it is achromatized.

For the purpose of illustrating the invention there is shown in the accompanying drawing a lens system which is athermalized to satisfy the conditions of athermalization heretofore described in connection with Equation 9 or Equation 25, and which is of a character wherein the ratios of the thermal nu and the chromatic nu values of the individual elements throughout the system are substantially a constant so that the system, on being achromatized, is also athermalized. The system shown in the drawing is a telescope objective comprising a positive front lens element I which carries the power of the system and a negative rear or back lens element II which corrects the system for spherical and chromatic aberration and for coma.

The foremost lens I is formed of a crown material, a plastic, for example, such as a copolymer having a relatively low coefficient of liner expansion and an index of refraction and a dispersion value comparable with crown glass. Element II of the system is formed of a suitable organic resin or plastic, such as a single polymer, and has optical characteristics, such as an index of refraction and a dispersion value of the magnitude found in optical flint glass while the expansion coefficient of the flint material is considerably greater than that of the material forming the element I. The crown and flint materials are chosen so that the thermal nu values and the chromatic nu values of the individual elements are related in the manner already described whereby this system becomes athermalized on its achromatization. A satisfactory resin for the crown material is a copolymer of cyclohexyl methacrylate and ethylene dimethacrylate formed from a mixture of equal volumes of the monomer of these substances, while styrene may be employed for the flint material. The optical and thermal properties of these materials have been heretofore specifically indicated and as already noted are of a character suitable for the intended purpose.

In the following table relating to the illustrated lens system, the column "Radius" refers to the radii of the spherical surfaces as measured in the same linear units as used to measure the focal length of the system, as, for example, millimeters. The column designated "Thickness and separation" refers to the thickness and separations of the lenses, as measured on the axis of the lens system in the same linear units as those used to measure the "Radius." The letter "D" indicates lens thickness, and the letter "L" separations. The term "$N_D$" issued to designate the index of refraction of the materials for the lenses as measured for the sodium "D" line. The column "V" designates dispersion value, $$\frac{N_D - 1}{N_F - N_C}$$

i. e., reciprocal dispersion, for the lens materials used.

F/5 Focal length = 100 mm.

| Lens | Radius | Thickness and separation | $N_D$ | V |
|---|---|---|---|---|
| I | $R_1 = +69.40$<br>$R_2 = -32.66$ | $D_1 = 3.77$<br>$L = .05$ | 1.50825 | 55.3 |
| II | $R_3 = -32.66$<br>$R_4 = -111.04$ | $D_2 = 1.95$ | 1.59 | 31 |

The lens system disclosed in the drawing was mounted in a suitable housing for a telescope as the objective thereof and was found to be substantially completely athermalized. The completed telescope was placed in a heated testing chamber where it was allowed to remain until the various parts of the telescope were substantially in equilibrium at 65° C. A number of test readings for parallax were then made, a reticle at the focus of the objective being used for this purpose. Similar testing was also carried out at substantially an equilibrium of −30° C. In both series of tests, the focus remained so nearly the same that parallax was never greater than one minute of arc.

The foregoing discussion of the invention has considered a lens system having elements constructed and arranged in such manner as to provide a substantially athermalized system as well as to provide a system having some lesser degree of athermalization. This latter-mentioned aspect of the invention is significant from the standpoint of employing a housing, having predetermined changes in length with temperature, as a means to provide a part of the athermalization desired, the system being mounted in the housing so that effects from changes in length of the housing are imparted to the system. Thus, if a partially athermalized system is mounted in a housing which, by its changes in length with temperature, is adapted to impart some degree of athermalization to the system, the system may be designed so that its lack of athermalization by selection will be equal to the degree of athermalization imparted by the housing. As previously noted, Equation 25 takes this into account in its housing factor, that is the summation of $$\left(\frac{h_2}{S_2'}\right)^2_K$$

$D_T L_K$ for the elements K of the system.

In using the housing to partially athermalize a system, $D_T L_K$ represents the rate of change with temperature of the distance from the second surface of an element K to the first surface of the next succeeding in the system, except in the case of the last element N of the system, where $D_T L_N$ is the rate of change with temperature of the distance from the second surface of the last element to a predetermined location within the housing which it is desired to maintain substantially in coincidence with the focal surface of the system.

In some instances, an object may shift its position along the optical axis in accordance with changes in temperature. As one example, such may occur in a projection system. Under these circumstances, if the temperature change affects the object distance $S_1$, that is the distance from the object to the first lens surface of the system, the rate of change $D_T S_1$ of $S_1$ with temperature will affect $D_T S_N$ in a manner so that $$D_T S_N' = -\frac{D_T S_1'}{S_1^2} - \sum_{K=1}^{N} \left[ \frac{\theta_1 h_1^2 + \theta_2 h_2^2}{\nu_T} + \left(\frac{h_1}{S_1'}\right)^2 n^2 D_T\left(\frac{t}{n}\right) + \left(\frac{h_2}{S_2'}\right)^2 D_T L \right]_K$$

(31)

If the terms of Equation 31 dependent on the lens powers, thicknesses and materials are segregated from those dependent on the lens housing, lens separations and the object distance, the condition for athermalization may be written $$\sum_{K=1}^{N}\left[\frac{\theta_1 h_1^2+\theta_2 h_2^2}{\nu_T}+\left(\frac{h_1}{S_1'}\right)^2 n^2 D_T\left(\frac{t}{n}\right)\right]_K = -\frac{D_T S_1'}{S_1^2} -$$

$$\sum_{K=1}^{N}\left[\left(\frac{h_2}{S_2'}\right)^2 D_T L\right]_K \quad (32)$$

the term on the left hand side of Equation 32 representing the lack of athermalization of the lens system considered apart from a housing and change of object distance and the term on the right hand side of Equation 32 representing the partial athermalization due to the housing, the change with temperature of lens separations, and the change with temperature of object distance.

In addition to elements with curved refracting surfaces, optical systems frequently contain elements having plane refracting surfaces and plane or curved reflecting surfaces or various combinations thereof. As will be well understood to the art, the equations and discussion heretofore given are equally well applied to optical systems made up of elements which are in optical alignment and have various types of surfaces. The term optical system, is therefore, employed in its generic sense in the specification and claims to denote a system which may contain elements having varied types of surfaces and the term optical element as employed in the specification and claims is intended to comprehend a lens, prism, plane parallel plate, or mirror.

In the specification and claims, where reference is made to an object to be imaged by an optical system, it is to be understood that imaging of the object at a finite or infinite distance is to be included within the scope of this language.

From the foregoing, it will be appreciated that I have accomplished the aims and objects of my invention in that I have provided athermalized systems and novel methods for effecting the athermalization of lens systems as well as the provision of systems of this character and methods for athermalizing such systems wherein all the elements thereof are formed of transparent organic plastic materials.

Since certain changes in carrying out the above methods, and certain modifications in the articles which embody the invention may be made without departing from its scope, it is intended that all matter contained in the above description shall be interpreted as illustrative and not in a limiting sense.

What is claimed is:

1. An optical system substantially athermalized for focal point, comprising a plurality of optical elements K from K equals 1 to K equals N, at least one of said elements being formed of material relatively highly subject to thermal effects and at least one of said elements being formed of material considerably less subject to thermal effects, said elements having predetermined indices of refraction, dispersion values, radii, thicknesses and focal lengths and being axially aligned at spacings which provide the system as a whole with a predetermined power, a correction at least in part of the optical aberrations thereof, and satisfy the condition that each element K has a value for the expression $$\left[\frac{\theta_1 h_1^2+\theta_2 h_2^2}{V_T}+\left(\frac{h_1}{S_1'}\right)^2 n^2 D_T\left(\frac{t}{n}\right)\right]_K$$

such that the sum of said values approximately equals zero, where $R_1$ is the radius of the first surface of an element K, that is the surface on the object side of such element; $R_2$ is the radius of the second surface of an element K, that is the surface on the image side of such element; $n$ and $V_T$ are respectively the index of refraction and the thermal nu value of the material which forms an element K;

$$D_T\left(\frac{t}{n}\right)$$

is the rate of change with temperature of the ratio of the thickness $t$ of an element K to the index of refraction of the material of such element; $S_1'$ is the image distance from the first surface of an element K; $h_1^2$ and $h_2^2$ are the position factors for the first and second surfaces respectively of an element K; and $\theta_1$ and $\theta_2$ are respectively the values $$\frac{n-1}{R_1} \text{ and } \frac{1-n}{R_2}$$

for an element K.

2. A partially athermalized optical system having a predetermined lack of athermalization for focal point, said system comprising a plurality of optical elements, at least one of said elements being formed of material relatively highly subject to thermal effects and at least one of said elements being formed of material considerably less subject to thermal effects, said elements having predetermined indices of refraction, dispersion values, radii, thicknesses and focal lengths and being axially aligned at spacings which provide the system as a whole with a predetermined power, a correction at least in part of the optical aberrations thereof, and at least approximately satisfy the condition expressed in equation form that $$\sum_{K=1}^{N}\left[\frac{\theta_1 h_1^2+\theta_2 h_2^2}{V_T}+\left(\frac{h_1}{S_1'}\right)^2 n^2 D_T\left(\frac{t}{n}\right)\right]_K =$$

$$-\sum_{K=1}^{N}\left[\left(\frac{h_2}{S_2'}\right)^2 D_T L\right]_K$$

where the left side of said equation gives the lack of athermalization of the system when the rates of change with temperature of the spacings between elements are neglected and where the right side of said equation is the partial athermalization provided by said neglected terms plus said predetermined and intended lack of athermalization, and wherein the individual elements of the system are generally represented in said equation by K and are specifically designated by K followed by a subscript which lies within the limits of from 1 for the first element of the system, that is the element nearest an object to be imaged by the system, to N for the last element of the system, that is the element most distant from the object; and wherein $R_1$ is the radius of the first surface of an element K, that is the surface on the object side of such element; $R_2$ is the radius of the second surface of an element K, that is the surface on the image side of such element; $n$ and $V_T$ are respectively the index of refraction and the thermal nu value of the material which forms an element K;

$$D_T\left(\frac{t}{n}\right)$$

is the rate of change with temperature of the ratio of the thickness $t$ of an element K to the index of refraction of the material of such element; $S_1'$ and $S_2'$ are respectively the image distances from the first and second surfaces of an element K; $h_1^2$ and $h_2^2$ are the position factors for the first and second surfaces respectively of an element K; $\theta_1$ and $\theta_2$ are respectively the values $$\frac{n-1}{R_1} \text{ and } \frac{1-n}{R_2}$$

for an element K; and $D_TL_K$ is the rate of change with temperature of the distance from the second surface of an element K to the first surface of the next succeeding element on the image side thereof except in the case of the last element N where $D_TL_N$ is said predetermined lack of athermalization.

3. In an optical system having a plurality of optical elements adapted to focus on an object at a distance S from the first surface of the system, that is the surface on the object side of the element of the system nearest the object, said distance S changing with temperature at a rate $D_TS$ and wherein said elements are formed of materials differently subject to thermal effects and are mounted in a housing having predetermined changes in length with temperature, said elements being mounted in said housing whereby effects from changes in the length of the housing will be imparted to the system, in combination, at least one element formed of material relatively highly subject to thermal effects and at least one element formed of material considerably less subject to thermal effects, said elements having predetermined indices of refraction, dispersion values, radii, thicknesses and focal lengths and being axially aligned at spacings which provide the system as a while with a predetermined power, a correction at least in part of the optical aberrations thereof, and at least approximately satisfy the condition expressed in equation form that $$\sum_{K=1}^{N}\left[\frac{\theta_1 h_1^2 + \theta_2 h_2^2}{V_T}+\left(\frac{h_1}{S_1'}\right)^2 n^2 D_T\left(\frac{t}{n}\right)\right]_K = \\ -\frac{D_TS_1'}{S_1^2}-\sum_{K=1}^{N}\left[\left(\frac{h_2}{S_2'}\right)^2 D_TL\right]_K$$

where the left side equation gives the lack of athermalization of the system when the system is considered apart from the housing and with fixed object distance S and where changes in length with temperature of the housing and the object distance S are of a magnitude which renders the right side of said equation substantially equal to the left side thereof and wherein the individual elements of the system are generally represented in said equation by K and are specifically designated by K followed by a subscript which lies within the limits of from 1 for the first element of the system, that is the element nearest an object to be imaged by the system, to N for the last element of the system, that is the element most distant from the object; and wherein $R_1$ is the radius of the first surface of an element K, that is the surface on the object side of such element; $R_2$ is the radius of the second surface of an element K, that is the surface on the image side of such element; $n$ and $V_T$ are respectively the index of refraction and the thermal nu value of the material which forms an element K;

$$D_T\left(\frac{t}{n}\right)$$

is the rate of change with temperature of the ratio of the thickness $t$ of an element K to the index of refraction of the material of such element; $S_1'$ and $S_2'$ are respectively the image distances from the first and second surfaces of an element K and $S_1$ is the object distance from the first surface of an element K; $h_1^2$ and $h_2^2$ are the position factors for the first and second surfaces respectively of an element K; $\theta_1$ and $\theta_2$ are respectively the values $$\frac{n-1}{R_1} \text{ and } \frac{1-n}{R_2}$$

for an element K; and $D_TL_K$ is the rate of change with temperature of the distance from the second surface of an element K to the first surface of the next succeeding element on the image side thereof except in the case of the last element N where $D_TL_N$ is the rate of change with temperature of the distance from the second surface of said last element to a predetermined location within the housing which is desired to be maintained substantially in coincidence with the focal surface of the system.

4. An optical system substantially athermalized for focal point, comprising a plurality of optical elements, at least one of said elements being formed of material relatively highly subject to thermal effects and at least one of said elements being formed of material considerably less subject to thermal effects, said elements having predetermined indices of refraction, dispersion values, radii, thicknesses and focal lengths and being aligned at spacings which provide the system as a whole with a predetermined power, a correction at least in part of the optical aberrations thereof including chromatic aberrations, and cause the summation $$\sum_{K=1}^{N}\left[\frac{\theta_1 h_1^2 + \theta_2 h_2^2}{V_T}+\left(\frac{h_1}{S_1'}\right)^2 n^2 D_T\left(\frac{t}{n}\right)\right]_K = 0 \text{ approximately}$$

where the individual elements of the system are generally represented by K and are specifically designated by K followed by a subscript which lies within the limits of from 1 for the first element of the system, that is the element nearest an object to be imaged by the system, to N for the last element of the system, that is the element most distant from the object; and where $R_1$ is the radius of the first surface of an element K, that is the surface of the object side of such element; $R_2$ is the radius of the second surface of an element K, that is the surface on the image side of such element; $n$ and $V_T$ are respectively the index of refraction and the thermal nu value of the material which forms an element K;

$$D_T\left(\frac{t}{n}\right)$$

is the rate of change with temperature of the ratio of the thickness $t$ of an element K to the index of refraction of the material of such element; $S_1'$ is the image distance from the first surface of an element K; $h_1^2$ and $h_2^2$ are the position factors for the first and second surfaces respectively of an element K; $\theta_1$ and $\theta_2$ are respectively the values $$\frac{n-1}{R_1} \text{ and } \frac{1-n}{R_2}$$

for an element K, each element K in the system having a thermal nu value $V_T$ and a dispersion value $V_C$ such as to substantially satisfy the condition that $$\left[\frac{V_T}{V_C}\right]_1 = \left[\frac{V_T}{V_C}\right]_2 = \cdots = \left[\frac{V_T}{V_C}\right]_N$$

whereby the functional relationship set forth in said first-appearing expression is approximately satisfied by the chromatic correction of the system.

DAVID S. GREY.

REFERENCES CITED

The following references are of record in the file of this patent:

UNITED STATES PATENTS

| Number | Name | Date |
|---|---|---|
| 1,325,936 | Fouasse | Dec. 23, 1919 |
| 2,193,742 | Rohm et al. | Mar. 12, 1940 |
| 2,314,838 | Kingston | Mar. 23, 1943 |
| 2,330,663 | Bennett et al. | Sept. 28, 1943 |
| 2,405,301 | Grey | Aug. 6, 1946 |
| 2,406,762 | Grey | Sept. 3, 1946 |

FOREIGN PATENTS

| Number | Country | Date |
|---|---|---|
| 490,381 | Great Britain | Aug. 15, 1938 |